Oct. 19, 1965   G. M. PUTNAM   3,212,729
WIRE DISPENSING APPARATUS
Filed April 22, 1963
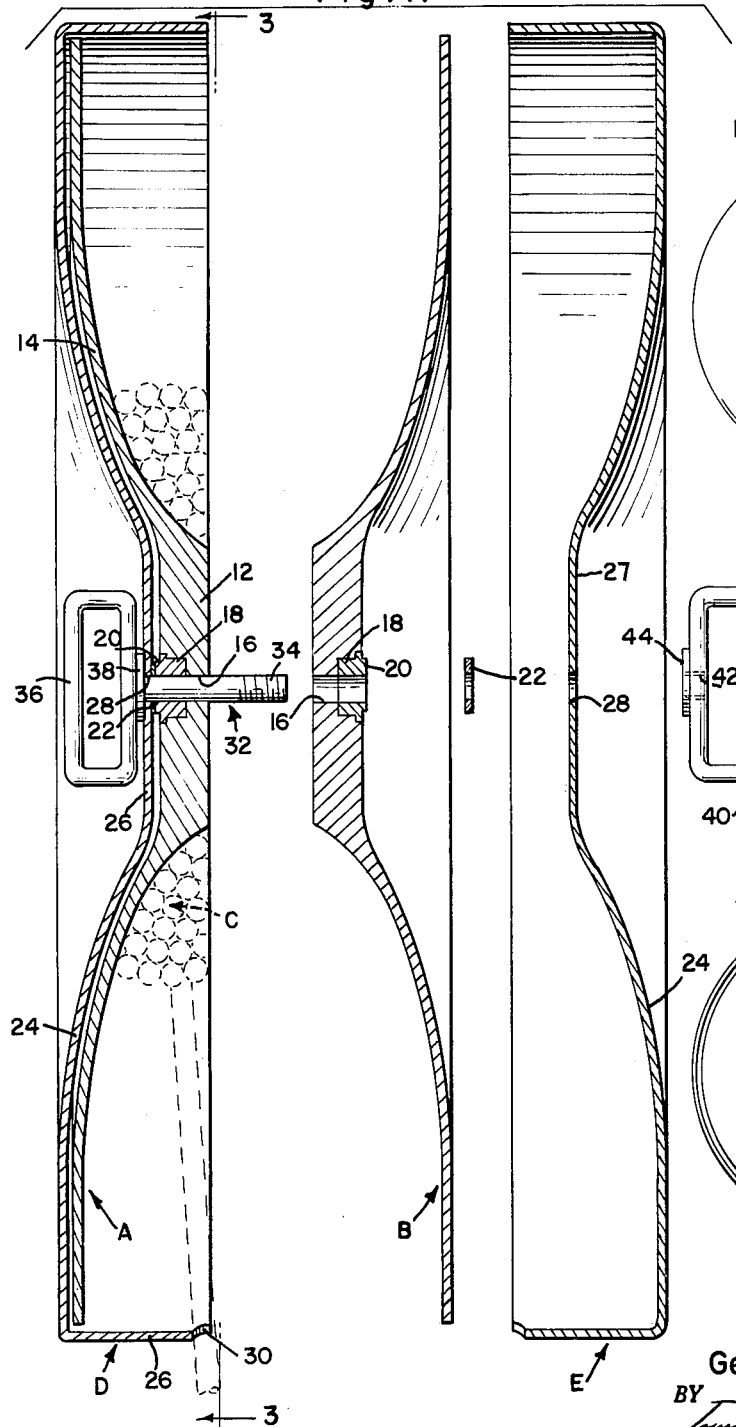
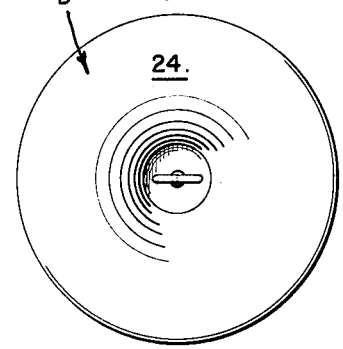
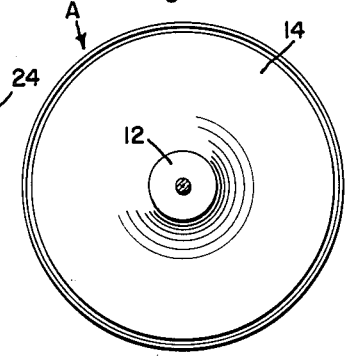
INVENTOR.
Gene M. Putnam
BY Townsend and Townsend
   attorneys United States Patent Office 3,212,729
Patented Oct. 19, 1965

3,212,729
WIRE DISPENSING APPARATUS
Gene M. Putnam, 800 Sonia Way, Mountain View, Calif.
Filed Apr. 22, 1963, Ser. No. 274,400
6 Claims. (Cl. 242—129)

This invention relates to a portable reel device on which a single coil of wire can be placed for ready dispensing.

The preferred embodiment of the invention shown in the drawing and described in detail hereinafter comprises in combination a split wire receiving spool formed from two substantially identical halves, a split casing for the reel having a small opening in the periphery thereof for passage of a single strand of wire therethrough, a bearing member affording free rotative movement of the spool relative to the casing, and a threaded axle for holding the parts together in operative position and for providing an axle on which the spool can rotate relative to the casing.

It has long been the practice to provide wire in coils from which the wire can be taken as needed. Wire so coiled is usually extremely resilient and difficult to handle. The wire tends to snarl or kink, thus requiring two or more men to properly pay out and install the wire.

Therefore it is an object of my invention to provide a wire dispensing reel that can be quickly loaded with a coil of wire, and which permits rapid dispensing of the wire therefrom without the attention of a human operator.

Another object is to provide a wire dispensing reel that entirely encloses a spool of wire thereby protecting the wire from injury by external abrasive forces.

Still another object is to provide a wire dispensing reel from which the wire can be pulled without backlash or snarling. The attainment of this object enables one man to pull wire through conduit without assistance.

Yet another object of the present invention is to provide a wire dispensing reel that may be quickly loaded in the field with a spool of wire. This object is realized by providing a reel and a housing therefor each of which are of split construction. They may therefore be separated readily for inserting of a coil of wire and assembled after the wire spool has been inserted.

A further object is to provide a wire dispensing reel that may be inexpensively constructed. That object is obtained because the spool and housing may each be constructed with two identical halves.

These and other objects will be more apparent after referring to the following specification and attached drawings in which similar characters of reference represent corresponding parts in each of the several views.

In the drawings:

FIG. 1 is a partially exploded cross sectional view of a wire dispensing reel according to my invention;

FIG. 2 is a side view on reduced scale taken from the left side of FIG. 1; and

FIG. 3 is a reduced scale view taken along line 3—3 of FIG. 1.

The embodiment of the invention hereinafter described generally includes a spool formed of two substantially identical halves A and B that are assembled together within the center of a coil of wire C and installed in a housing formed with two substantially identical halves D and E.

Each of the spool halves A and B includes a centrally located hub 12 having integrally attached thereto and radiating outwardly therefrom a flange portion 14. The outer edge of flange 14 defines a circle and the surface of the flange is curved to form a concave inward surface on spool half A for receipt of a coil of wire. The center of hub 12 is provided with a hole 16. The outer end of hole 16 is provided with an enlarged portion for receiving a ball or roller bearing 18. Bearing 18 is provided on the exterior end thereof with an extended inner bearing race 20 shaped to engage a washer 22. Washer 22 is adapted to be embedded in or otherwise affixed to housing half D, E but is shown sperate therefrom in FIG. 1 for clarity.

The housing halves D and E are formed with a circular plate 24 having around the entire periphery thereof a flange 26. Flange 26 is preferably normal to the plate 24 and integral therewith. The inner diameter of flange 26 is sufficiently larger than the outer diameter of spool halves A and B to permit the latter to freely rotate within the housing without rubbing the flange. The radial clearance between the housing and the spool halves should not be great enough, however, to permit a wire strand from coil C to fit therebetween. Plate 24 has in the center thereof a circular indented portion 27, which portion is generally concentric with the outer periphery of plate 24 and is somewhat resilient. The indented portion is provide with a centrally disposed opening 28 for registry opposite hole 16 in spool half A. Washer 22 is secured to the inner surface of indented portion 27 with the opening therein aligned with opening 28. Flange 26 has a semi-circular shaped notch 30 in an edge of the flange remote from the edge attached to plate 24.

A bolt assembly 32 is provided at one end of its shank with a threaded portion 34 and at the opposite end with a flattened eye 36. The daimeter of bolt 32 affords a snug rotational fit within hole 16 of spool halves A and B, hole 28 in plate 24 and the inner race of bearings 18. A flat washer 38 is provided for placement between eye 36 and the surface plate 24, and is preferably integral with bolt assembly 32. A nut 40 having an interiorly threaded opening 42 is provided for threaded engagement with threads 34 on bolt assembly 32. Nut 40 defines a generally flattened rectangular eye with threaded opening 42 disposed substantially midway through one long side thereof. A washer 44 is provided for placement between nut 40 and housing half E, and is integral with the body of nut 40.

In operation the device is first disassembled to permit placement of a coil of wire on one spool half, A for example. Spool half B is then placed upon the coil and spool half A in such a position that the hubs 12 of the halves A and B contact one another. At this stage it is convenient to remove any tape or the like that is bound around the coil of wire C. The assembled spool is then placed in a housing half D and bolt assembly 32 is inserted through hole 28 and hole 16 with washer 22 in engagement with inner bearing race 20. After the end of the wire of coil C is placed in semi-circular notch 30, the other housing half E is placed upon bolt assembly 32 with washers 22 spacing the spool from the housing interior. Threading of nut 40 onto threads 34 of bolt assembly 32 completes the assembly of the reel.

The reel assembly may now be conveniently carried from place to place with no danger to the wire from exterior abrasive forces. When it is desired to dispense wire from the reel, nut 40 is adjusted to afford a suitable amount of rotational friction between the spool and the housing, and the wire from coil C can readily be removed without special attention being paid to the prevention of backlash. Kinking or twisting of the wire is avoided because overrunning of the spool causes the wire to expand radially within the housing until the pressure thereof against the housing interior terminates spool rotation.

Because head 36 and nut 40 fit within indentations 26, there are no protruding edges, and therefore a plurality of reels can be safely stacked upon one another. Eyes 36 and 40 form convenient finger holes for carrying the reel. The eyes also provide means by which the reel is hung or suspended from a stand or the like.

In one reel constructed in accordance with my invention a spool having an outside diameter of about 19½ inches and a distance between opposing flanges 14 at their most spaced-apart location of about 4¼ inches, a 500-foot coil of #8 to #14 wire can be conveniently installed. Larger size wire and multiple strand wire are readily placed on this spool in coils of 250-foot lengths. Thus it may be seen that a reel constructed in accordance with my invention is versatile in that it may be used to advantage with various sizes and types of wire.

While one embodiment of my invention has been shown and described, other adaptations and modifications will be apparent without departing from the spirit and scope of the invention.

What is claimed is:

1. A reel, comprising a sectional spool formed of two similar half sections, a casing formed of two similar half sections enclosing said spool and having an outlet passage for material wound about said spool, means having a shank for detachably interconnecting said spool and said casing and adapted to secure the sections of said spool and said casing in operative assembly, said spool and said casing having axially aligned openings in their central portions for receiving said shank, said shank serving also as an axle upon which said spool is revolvably mounted.

2. A reel for retaining and dispensing wire, comprising a sectional spool formed by a pair of separable complementary hub members having flanges of large diameter tapering outwardly from the outer end of each of said hub members, each of said hub members having a centrally disposed hole, a casing for said spool formed by a pair of separable complementary members surrounding said spool and the sides of which are substantially parallel to said hub flanges, each of said casing members having a flange substantially perpendicular to the sides thereof and sufficiently spaced from the spool so that the spool can rotate relative to the casing, each of said flanges being formed with a semi-circular opening on the edge thereof forming a wire dispensing outlet when the casing members are placed together, each of said casing members having a centrally disposed hole, and an axle for mounting said spool for rotation with said housing, said axle having means for compressing the hub member and casing members longitudinally of the axle for retaining said spool members and casing members in operative assembly.

3. The invention of claim 2 in combination with a bearing mounted in each of said spool hubs concentric with said central hole, said bearing having an extended inner race, and a washer affixed interior of each said casing forming members for engaging said extended inner bearing race, thereby to form a clearance space between said spool and said casing.

4. A dispenser for heavy duty electrical wire, comprising a sectional spool formed of two identical spool halves each of which has a peripheral flange formed with a concave inward surface, a sectional casing formed of two identical casing halves for enclosing said spool and defining the same general shape as said spool, each said half being formed with a peripheral flange extending substantially formal from the casing, each said flange having a semi-circular opening at its outer edge and means for rotatably mounting said spool in said casing, whereby said flange semi-circular openings form a circular wire dispensing outlet when said spool is mounted in said casing.

5. A wire dispensing reel comprising a spool formed of two identical spool halves each having a centrally disposed hole therethrough, a housing for said spool formed of two identical housing halves each having a centrally disposed hole therethrough, each housing half being formed with a centrally indented circular plate and a flange about the periphery of the plate having a semi-circular notch in the edge of the flange, a bolt assembly for insertion into the holes in the spool and housing halves, said bolt having a threaded portion at one end and an eye defining member at the opposite end, and a nut for threaded engagement with the threaded portion of the bolt, said nut defining an eye, said nut and the eye defining member on said bolt being adapted to fit entirely within centrally indented portion of the circular plate.

6. The invention of claim 5 in combination with a bearing disposed in the hole through each said spool half, said bearings being formed with an extended inner race, and a washer for placement on the bolt between said extended races and the housing halves whereby a clear space is formed between said spool and said housing for affording free rotation movement of said spool in said housing.

References Cited by the Examiner

UNITED STATES PATENTS

| 2,030,465 | 2/36 | Nist | 206—52 |
| 2,201,305 | 5/40 | Springer | 242—96 |
| 2,484,090 | 10/49 | Hedfield | 242—118.8 |

FOREIGN PATENTS 567,984  3/24  France.

MERVIN STEIN, *Primary Examiner.*

RUSSELL C. MADER, *Examiner.*